May 5, 1970   G. ECKELT   3,509,931
FIBER REINFORCING BELT FOR VEHICLE TIRES
Filed Oct. 5, 1965
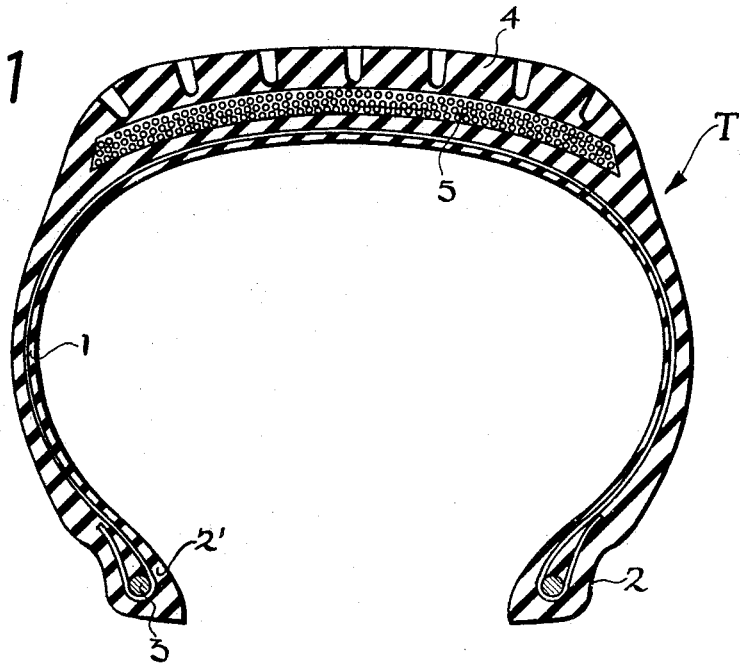
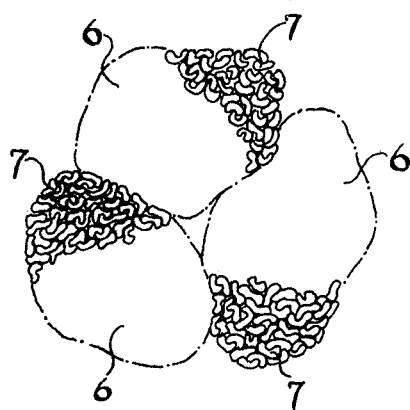
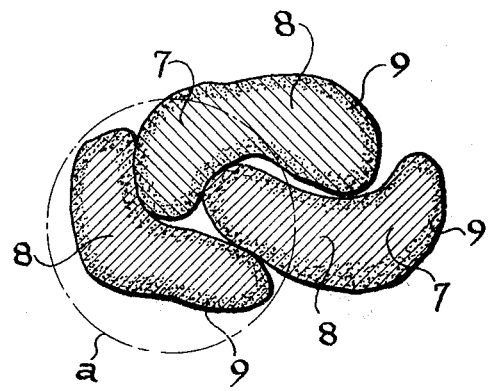
INVENTOR
Gerhard Eckelt
BY

United States Patent Office 3,509,931
Patented May 5, 1970

---

3,509,931
FIBER REINFORCING BELT FOR VEHICLE TIRES
Gerhard Eckelt, Hannover, Germany, assignor to Continental Gummi-Werke Aktiengesellschaft, Hannover, Germany
Filed Oct. 5, 1965, Ser. No. 493,210
Int. Cl. B60c 9/18; B29h 17/28
U.S. Cl. 152—359                        5 Claims

ABSTRACT OF THE DISCLOSURE

Rayon fiber belt embedded radially inwardly from tread of a resilient tire body resistant against upsetting with less tread wear. Each fiber of rayon material has an irregular cross-sectional area planimetered by a circumscribing circle of a diameter ranging between 35 and 100μ. Fiber particularly of rayon has hooked, arcuate, or kidney shape in cross section for interlocking support of fibers providing eight-fold increase of buckling stress without materially affecting flexibility thereof. Individual fibers are rayon cord in the tire belt and specifically have a titer 2000/3 grams/den.

---

The present invention relates to vehicle pneumatic tires, and, more specifically, concerns a belt-type reinforcing insert for such tires, which comprises a plurality of substantially parallel cord-like threads of textiles, especially rayon.

Tire belts, as generally understood, are annular reinforcing inserts interposed between the tire carcass and the tread surface of a pneumatic tire. These reinforcing inserts usually extend over the width of the tread surface and comprise two or more cord-like thread layers which in turn are substantially parallel to each other while the cord-like threads one layer usually cross relative to the cord-like threads of the adjacent layer at a relatively small angle.

Belts of the above-mentioned type, the cord-like threads of which are firmly vulcanized into the zenith portion of the pneumatic tire bodies, are provided with carcasses of which the threads, cords and the like extend at a right angle with regard to the circumferential direction of the tire, and are intended to stabilize the tire body. In particular, the belt is intended to absorb the transverse forces and thus to prevent extensive lateral deformations of the tire. A belt is furthermore intended to bring about a certain stiffening and consolidation of the tread portion. When a tire belt in its entirety is not only pull resistant but also resistant against buckling or upsetting, undesired deformations within the range of the ground-engaging surface ellipse will be avoided, so that the tread strip will be subject to only a relatively low wear.

It is known to make the tire belt of steel wire strands which are substantially parallel to each other. While the employment of steel wire strands yields certain advantages, a belt composed of steel wire strands is only slightly deformable, and the dynamic softness or shock absorbing ability is relatively low. Moreover, in many instances, it is difficult to assure a good adherence between the wire strands and the rubber material.

It is also known to build a tire belt of rayon cord layers. A tire made with such a belt is considerably softer than a tire made with a belt of wire strands, however, the heretofore known belt construction employing rayon cord layers do not have sufficient resistance against buckling or upsetting stresses.

It is, therefore, an object of the present invention to provide a belt for pneumatic tires, which, while having the advantages of heretofore known belts, avoids the disadvantages thereof.

It is another object of this invention to provide a belt for pneumatic tires which will, when incorporated in a tire, greatly increase the resistance of the tire against buckling or upsetting while giving the tire soft riding characteristics.

These and other objects and advantages of the invention will appear more clearly from the following specification in connection with the accompanying drawing, in which:

FIG. 1 is a partial section through a belted tire having a tire belt according to the present invention;

FIG. 2 illustrates on a greatly enlarged scale a cord-like thread for a tire belt according to FIG. 1;

FIG. 3 illustrates, on a scale still larger than that of FIG. 2, three individual fibers of the yarn forming the cord-like threads for a belt according to the invention.

According to the present invention, the individual fibers for the yarn of the cord-like thread are formed of a fiber having a diameter greater than 35μ (0.035 millimeters) or, in other words, the transverse cross-sectioning circumferential circle for each fiber has a diameter which is in excess of 35μ. In this connection, it is by no means necessary to employ individual fibers which have a circular cross-section. In many instances, it is even advantageous to employ individual fibers having a cross-sectional shape deviating greatly from that of a circle. Thus, an arched, especially kidney-shaped cross-sectional shape of the fiber may be employed which is particularly advantageous because, in such instance, the individual fibers can positively interengage each other so as to unite in the yarn of the cord-like thread. Under these circumstances, the fibers interlock and support each other.

With heretofore known belts of rayon threads, individual fibers are employed which have a diameter of approximately 12μ. If now, on the basis of the present invention, individual fibers are employed with a diameter of approximately 35μ, the admissible buckling stress is increased eight-fold without materially affecting the flexibility of the cord thread. The rayon corn thread employed for a tirebelt according to the invention will thus have a sufficiently high pull resistance while at the same time possessing increased resistance against the pressure in the longitudinal direction of the thread. This, in turn, brings about that the resistance of the tire belt against buckling or upsetting is greatly increased whereby the wear of the tread strip is reduced and the life of the tire is increased.

Referring now to the drawing in detail, the tire body T of rubber material as illustrated in FIG. 1 has a carcass 1 the threads of which extend over the shortest path from one bead 2' to the next bead 2, and thus extend at a right angle with regard to the circumferential direction of the tire. The anchoring of the carcass thread is effected in customary manner by looping the ends of the carcass thread around the bead core 3 in the respective tire beads 2, 2'. Above carcass 1 there is arranged an annular belt 5 which extends substantially over the width of the tread strip 4 and is firmly vulcanized into the rubber material of the tire. Tire belt 5 comprises two or more layers having the cord threads which may form an angle of from 5 to 25° with the circumferential direction of the tire, and, more specifically, in such a way that the cord threads of adjacent layers cross each other. Preferably, a rayon cord is employed with a titer 2000/3 grams/den. with 150 individual fibers in the yarn.

As mentioned above, yarn 6 consists of 150 individual fibers 7 having a cross-sectional shape, indicated in FIG. 3. The circle $a$ which circumscribes a cross section of the individual fiber 7 has a diameter of from 50 to 60μ. If desired, it is also possible to select such individual fibers 7 which have a diameter up to approximately 100μ.

FIG. 3 further indicates that the cross-sectional shape of the individual fibers greatly deviates from the circular shape. The fibers 7, as shown in FIG. 3 have a kidney-shaped cross-section and can interlock with respect to each other so positively that the theoretical resistance against buckling stress calculated on the basis of the individual fibers will actually be exceeded. Furthermore, the structure of the individual fibers 7 is of importance in connection with the present invention. More specifically, it is possible to employ a particularly favorable structure of the individual fibers. In view of the relatively large effective diameter of the above mentioned individual fibers, it is possible to select a greater structural strength for the outer skin or the layer of individual fibers forming the outer skin. In other words, the core of the individual fibers may have less strength than the outer layer of the individual fibers. Such a structure of the individual fibers greatly increases the resistance against buckling in longitudinal direction of the individual fibers.

More specifically with regard to FIG. 3, the individual fiber 7 has been shaded in different ways so as to indicate a core 8 and the outer layer 9 forming the outer surface of individual fiber 7, said outer layer 9 having a considerably greater structural strength than core 8.

In connection with FIG. 3 and more specifically with regard to the circle $a$ circumscribing the cross section of individual fiber 7, it should be noted that the diameter of a circle which has the same surface as the planimetered non-circular fiber cross-sectional area amounts to approximately from 30 to 40$\mu$. This "theoretical" diameter should as far as possible be in a particular range, and preferably should equal approximately from 30 to 70% of the diameter value which is obtained in conformity with the circumscribing circle $a$. Preferably, the invention is realized with fiber cross-sectional shapes which deviate from the cross-sectional shape of a circle.

It is, of course, to be understood that the present invention is, by no means, limited to the particular construction and arrangement shown in the drawing, but also comprises any modifications within the scope of the invention.

What I claim is:

1. In a vehicle pneumatic tire having an annular tire body of rubber material defining a tread and having an annular reinforcing belt with substantially parallel cord threads of synthetic fiber rayon textile material provided radially inwardly of the tread of the tire, the improvement therewith which comprises a cross-sectionally irregular, arcuate and elongated fiber of rayon textile material exclusively in the reinforcing belt, in which a circle circumscribing cross section of individual fibers of the cord thread exceeds 35$\mu$ and ranges up to substantially 100$\mu$ in planimetered non-circular fiber cross-sectional area, individually amounting to from 30 to 40$\mu$ diameter equaling from 30% to 70% of diameter of said cross section circumscribing circle.

2. A tire having the belt according to claim 1, in which said individual rayon fibers having cross-sectional diameter purposely individually in excess of 35$\mu$ are rayon cord in particular and have an arch-shaped cross-section interlocking complementary with respect to each other, said rayon cord itself specifically having a titer 2000/3 grams/den.

3. A tire having the belt according to claim 1, in which said individual rayon fibers with cross-sectional diameter purposely individually in excess of 35$\mu$ have cross-sectional shape of the individual fibers each in a kidney-shape and purposely providing eight-fold increase of buckling stress collectively without materially affecting flexibility thereof.

4. A tire having the belt according to claim 1, in which said individual fibers with cross-sectional diameter purposely individually in excess of 35$\mu$ have planimetered hook cross section for positively interengaging each other in a complementary interlock providing resistance against buckling stress collectively exceeding that of individual fibers.

5. A tire having the belt according to claim 4, in which said individual fibers are rayon having cross-sectional diameter purposely individually in excess of 35$\mu$, each fiber consisting of a central core and an outer surface layer thereon having a greater structural strength than that of said core of the individual fiber.

References Cited

UNITED STATES PATENTS

| | | | |
|---|---|---|---|
| 2,782,830 | 2/1957 | Wallace | 152—361 X |
| 2,844,181 | 7/1958 | Riggs et al. | 152—359 X |
| 3,308,007 | 3/1967 | Shepard | 156—110 X |
| 2,777,775 | 1/1957 | Edwards et al. | 106—165 |

ROBERT F. BURNETT, Primary Examiner

R. L. MAY, Assistant Examiner

U.S. Cl. X.R.

152—361; 161—144, 175, 177